United States Patent Office 3,694,237
Patented Sept. 26, 1972

3,694,237
EDIBLE INK
Chester J. Piotrowski, Royersford, Pa.
(% Colorcon Inc., Moyer Blvd., West Point, Pa. 19486)
No Drawing. Filed Mar. 17, 1971, Ser. No. 125,329
Int. Cl. C09d 11/08
U.S. Cl. 106—30                                5 Claims

ABSTRACT OF THE DISCLOSURE

An edible ink composition for applying indicia to a capsule or tablet comprising partially esterified purified shellac, ethyl alcohol, and a coloring substance selected from edible pigments, lakes, and dyes wherein the partially esterified shellac comprises from about 10% to 50% of the total shellac solids.

BACKGROUND OF THE INVENTION

This invention relates to edible ink compositions suitable for marking confectionery and pharmaceutical tablets and capsules, and more particularly concerns shellac based ink compositions of the type illustrated by U.S. Patent No. 3,258,347 which issued on June 28, 1966 to James C. Brown for "Edible Pharmaceutical Inks," and U.S. Patent No. 2,948,626 which issued on Aug. 9, 1960 to Roy Y. Sanders, Jr. for "Edible Pharmaceutical Ink and Process of Using Same."

The shelf life of inks of this type has been limited because of a natural tendency for the shellac, in solution in alcohol, such as ethyl, isopropyl and butyl alcohol, to esterify as time goes on. As the shellac esterifies, it becomes very tacky and causes a number of problems. One of the problems caused by this progressive esterification of the shellac is that the ink picks-off or transfers from one printed tablet to another since the highly esterified ink does not dry and remains tacky.

Shellac is referred to herein by its percent of ester, i.e., a shellac having 20 parts esterified shellac solids to 80 parts un-esterified shellac solids by weight is referred to as 20% esterified shellac.

When an edible ink is formulated for use in branding tablets, capsules and the like, certain parameters must be taken into consideration. One of the important parameters to be considered is the drying time, or "set-to-touch-time" referred to, for example, in Brown Patent No. 3,258,347, wherein it is stated at column 3, lines 50–55, that optimum transfer characteristics of the ink are obtained when the set-to-touch-time is two to four minues. This tackiness problem is also discussed in Sanders U.S. Patent No. 2,948,626 at column 3, lines 60–67, which states that "where the drying time was too slow, spotting or smudging of the tablets occurred in the containers and when the drying time was too fast an insufficient transfer occurred and further the ink tended to clog the engraving and the transfer rollers."

Prior art edible inks are made with dry shellac, ethyl alcohol, plasticizers and/or detackifiers, pigments or dyes, and solvents which give a desired drying time, say three minutes. As the ink ages, a process occurs wherein the acid groups of the shellac react with the ethyl alcohol to form an ethyl ester of the shellac. The presence of the shellac ester increases the drying time of the ink, and as the amount or precentage of ester increases, the drying time is increased, eventually to a point where the drying time is too long, causing offset, or pick-off, or transfer of the ink from one printed piece or table to another. Accordingly, it has been noted that the drying time of prior art inks increases with age, and this limits the shelf or storage life of the ink.

SUMMARY OF THE INVENTION

It is an object of this invention to provide a shellac base ink having an optimum drying time, which drying time will not unduly lengthen with time, thereby lengthening the shelf or storage life of the ink. This result is obtained by using a partially esterified shellac as the ink base, and preventing further esterification, and lengthening the drying time, by adding ammonium hydroxide (or other suitable base such as sodium hydroxide, potassium hydroxide, or calcium hydroxide) to the partially esterified shellac to stop the esterification reaction and block the acid groups of the shellac.

What is not obvious to one skilled in the art, is that partially esterified shellac improves the working qualities of an ink, since inks which have become esterified by the natural process are unsatisfactory for use because of their increased tackiness and prolonged drying time. However, I have discovered that the esterified portion of the shellac actually provides an improved ink if the amount of esterification is controlled and stopped at a certain point, preferably at 24% parts esterified shellac solids to 76% un-esterified shellac solids by weight.

Another point which is not obvious to one skilled in the art is that the addition of a tacky material (shellac ester) to an already tacky material (un-esterified shellac) produces a material which in itself is not as tacky as either. That is to say, if one were to measure the tack of a six pound cut refined wax-free shellac (un-esterified) he would obtain a certain result. Further, if he were to then esterify that shellac to say 100%, and measure its tack, he would find that the tackiness is much greater than the un-esterified shellac. Accordingly, he would expect that by blending say 20 parts esterified shellac to 80 parts un-esterified shellac by weight, he would obtain an undesirable, tacky material. What I have discovered is that in fact the blend of 20 parts esterified shellac with 80 parts un-esterified shellac produces a material which has excellent drying characteristics (an indication of amount of tack), bettter than either component.

In applying an indicia to a confectionery or pharmaceutical tablet or capsule, a process of printing is used known as offset gravure. In this method, an etched or engraved gravure cylinder is rotated through a well which contains the ink to be used in printing. A very thin blade wipes the excess ink from the gravure roll, leaving only the etch filled in with ink. The gravure roll contacts a rubber transfer roll which in turn contacts the piece which is being printed. Prior to this invention, conventional inks made with un-esterified shellac would build up on the transfer roll, causing the indicia to be of poor quality and unacceptable, and this usually occurred within a short period of time of operating the gravure printer, for example, 20–30 minutes. This ink build up on the transfer roll required the stopping of the printing operation so that the transfer roll could be cleaned with an appropriate solvent. This ink build up and cleaning problem occurs with conventional inks even when the ink is fresh. However, when the ink is old, an additional problem arises because the old ink has esterified to the point where it has very slow drying characteristics, so that the old ink after being applied to the piece is picked off onto other pieces, causing an unacceptable mark.

My ink, because of the partial and controlled esterification of the shellac, permits much longer times between cleaning of the transfer roll, for example two hours, and also permits faster and easier clean-up with an appropriate solvent.

The ink compositions of the present invention comprise a partially esterified purified shellac mixed with ethyl alcohol and various selected conventional edible dyes, pigments and lakes as necessary to provide the color ink desired.

DESCRIPTION OF THE PREFERRED EMBODIMENTS

The following examples of my inks are given, with the ingredients being given in percent by weight:

Example 1

White ink: Percent
- Esterified shellac solids (20% ester) -------- 30.0
- Ethyl alcohol 200 pf. ---------------------- 36.7
- Cellosolve ------------------------------- 1.0
- Titanium dioxide ------------------------- 30.0
- Water ----------------------------------- 2.3

The pigment ($TiO_2$) to binder (esterified shellac solids) ratio is 1:1 by weight. Cellosolve is Union Carbide's ethylene glycol monoethyl ether, and is added to improve the drying qualities of the ink.

Example 2

White ink: Percent
- Esterified shellac solids (24% ester) -------- 24.0
- Ethyl alcohol 200 pf. ---------------------- 38.0
- Titanium dioxide ------------------------- 36.0
- Water ----------------------------------- 2.0

The pigments ($TiO_2$) to binder (esterified shellac solids) ratio is 1.5:1 by weight.

Example 3

White ink: Percent
- Esterified shellac solids (22% ester) -------- 20.0
- Ethyl alcohol 200 pf. ---------------------- 38.0
- Titanium dioxide ------------------------- 40.0
- Water ----------------------------------- 2.0

The pigment to binder ratio is 2:1 by weight.

Example 4

Black ink: Percent
- Esterified shellac solids (24% ester) -------- 34.0
- Ethyl alcohol 200 pf. ---------------------- 59.0
- Channel black --------------------------- 6.0
- Water ----------------------------------- 1.0

The pigment to binder ratio is 1:5.7.

Example 5

Black ink: Percent
- Etserified shellac solids (24% ester) -------- 32.0
- Ethyl alcohol 200 pf. ---------------------- 59.0
- Channel black --------------------------- 8.0
- Water ----------------------------------- 1.0

The pigment to binder ratio is 1:4.

Example 6

Red ink: Percent
- Esterified shellac solids (22% ester) -------- 30.0
- Ethyl alcohol 200 pf. ---------------------- 36.7
- Cellosolve ------------------------------- 1.0
- Red iron oxide --------------------------- 30.0
- Water ----------------------------------- 2.3

The pigment ($TiO_2$) to binder (esterified shellac solids) ratio is 1:1 by weight. Cellosolve is Union Carbide's ethylene glycol monoethyl ether, and is added to improve the drying qualities of the ink.

Example 7

Gray ink: Percent
- Esterified shellac solids (24% ester) -------- 24.0
- Ethyl alcohol 200 pf. ---------------------- 38.0
- Titanium dioxide ------------------------- 35.6
- Channel black --------------------------- 0.4
- Water ----------------------------------- 2.0

Example 8

Blue ink: Percent
- Esterified shellac solids (24% ester) -------- 26.8
- Ethyl alcohol 200 pf. ---------------------- 41.0
- Titanium dioxide ------------------------- 10.2
- FD&C Blue No. 1 Lake -------------------- 20.0
- Water ----------------------------------- 2.0

Example 9

Green ink: Percent
- Esterified shellac solids (20% ester) -------- 25.4
- Ethyl alcohol 200 pf. ---------------------- 38.2
- FD&C Yellow No. 5 Lake ------------------ 6.6
- FD&C Blue No. 1 Lake -------------------- 11.5
- Titanium dioxide ------------------------- 16.5
- Water ----------------------------------- 1.8

Example 10

Black ink: Percent
- Esterified shellac solids (20% ester) -------- 33.2
- Ethyl alcohol 200 pf. ---------------------- 60.3
- Channel black --------------------------- 6.0
- Water ----------------------------------- 0.5

Example 11

White ink: Percent
- Esterified shellac solids (24% ester) -------- 26.4
- Ethyl alcohol 200 pf. ---------------------- 32.1
- Titanium dioxide ------------------------- 34.5
- Ethylene glycol monoethyl ether ----------- 2.0
- Water ----------------------------------- 5.0

The following example of an ink is given using as the vehicle a shellac which has an ester content of 10% and a pH of 8.5.

Example 12

Black ink: Percent
- Esterified shellac solids (10% ester) -------- 34.2
- Ethyl alcohol 200 pf. ---------------------- 59.0
- Channel black --------------------------- 6.0
- Water ----------------------------------- 0.8

The following example of an ink is given using as the vehicle a shellac which has an ester content of 50% and a pH of 8.6.

Example 13

Black ink: Percent
- Esterified shellac solids (50% ester) -------- 34.0
- Ethyl alcohol 200 pf. ---------------------- 58.8
- Channel black --------------------------- 6.0
- Water ----------------------------------- 1.2

Although the present examples are directed to the preparation of white, red, blue, green, and black inks utilizing titanium dioxide, red oxide color, channel black, yellow and blue lakes as the pigments and dyes, it is understood that any of the commercially available dyes, lakes, and pigments which have been approved for use in edible food and drug compositions, including D & C Red 36, D & C Red 7, FD & C Red 3, FD & C Yellow 6, FD & C Red 2, and FD & C Blue 2, may be successfully utilized in the present invention to produce ink compositions of any of a variety of colors, such as for example, red, orange, lavender, and light brown.

A method of producing the partially esterified shellac is given:

Example 14

Gms.
- 6 lb cut refined wax free shellac in anhydrous ethyl alcohol ---------------------------------- 620
- Ethyl alcohol 200 pf. ---------------------- 180
- Concentrated sulfuric acid ----------------- 1.4

The above materials were mixed well and a sample was taken. After complete mixing a sample was withdrawn and titrated with .1 normal alcoholic potassium hydroxide to a phenolphthalein end point to determine the acid value. The mixture was placed in an oven at 40° C.

and the acid value determined periodically until the esterification reached a level of 24%. The reaction was then stopped by adding 18 gms. of concentrated ammonium hydroxide. The pH of the resultant solution was 8.6.

The six pound cut shellac-alcohol mixture employed in the ink compositions of this invention is a commercially available solution which consists of 6 pounds of shellac per gallon of alcohol. This shellac composition is preferably a purified shellac which is free of arsenic and rosin. The ethyl alcohol solvent is a grade of substantially pure ethyl alcohol. Other solvents may be used including methyl, n-propyl, and n-butyl alcohol, but the most commonly used and preferred solvent is ethyl alcohol.

Also, the other ingredients of the inventive ink compositions, including the color lakes, pigments and dyes, are non-toxic products approved by the U.S. Food and Drug Administration as fit for human consumption.

The quantities of the ingredients which are used in producing the edible inks of this invention may be varied within limits. For example, the esterified shellac portions may comprise from about 10% to 50% by weight of the total shellac solids, but in the preferred edible ink composition the esterified shellac comprises from about 20% to 25% by weight of the total shellac solids. The quantities of the edible ink composition may comprise by weight from about 20% to 40% of shellac solids, from about 30% to 60% of anhydrous ethyl alcohol, from about 6% to 40% of coloring substance, from about 0.5% to 5% of water, and about 1% of ethylene glycol monoethyl ether (such as Cellosolve by Union Carbide).

In summary, the present invention concerns the preparation of a novel ink composition which has as its binder a shellac, a portion of which has been esterified to a controlled degree. The inventive concept includes the discovery that by esterification of a certain portion of the shellac solids in an ink, followed by the addition of a base to stop this reaction permanently, an ink is obtained which has an extended shelf life. In addition, the invention has superior working qualities in that it provides improved adhesion to the substrate and eliminates the pick-off problem. Also, the inventive ink does not build up as quickly as conventional inks on the printing equipment and so it requires less frequent cleaning. Moreover, cleaning of the inventive ink from the printing equipment is quicker and easier since it may be done using water or a mild soap solution as the solvent. In stopping the esterification of the shellac, the adding of the ammonium hydroxide makes the shellac water soluble.

The ink of this invention is a water washable ink while wet, and when dry it may be removed with a mild soap solution or with alcohol, which is highly advantageous since the printing rolls may be cleaned quickly and easily.

I have found that the pH of the inventive ink is preferably 7.8, but the ink is satisfactory if the pH is in the range of about 7.2–8.5.

I have further found that when the shellac is 55% ester, the ink is no longer water soluble, and therefore not satisfactory from the standpoint of cleaning the printing rolls with water.

I claim:
1. An edible ink composition for applying indicia to a capsule or tablet, confectionery, discrete edible solid, and the like, comprising by weight from about 20% to 40% of partially esterified purified shellac solids, from about 30% to 60% of alcohol selected from the group of ethyl, methyl, propyl, and butyl alcohols, and from about 6% to 40% of a coloring substance selected from edible pigments, lakes, and dyes, wherein the esterification of the shellac has been arrested at about 10% to 50% by weight of the total shellac solids.

2. The edible ink composition of claim 1, including from about 0.5% to 5.0% of water.

3. The edible ink composition of claim 1 also including about 1% of ethylene glycol monoethyl ether.

4. The edible ink composition of claim 1 wherein said solvent is ethyl alcohol.

5. A method of making an edible ink composition for applying indicia to a capsule or tablet, comprising partially esterifying an alcoholic solution of refined wax-free shellac with concentrated sulfuric acid in an amount sufficient to produce 10% to 50% by weight esterification of the shellac in an oven at about 40° C., arresting the esterification reaction with concentrated ammonium hydroxide, and mixing therein a coloring substance selected from edible pigments, lakes, and dyes.

References Cited

UNITED STATES PATENTS

| 2,425,023 | 8/1947 | Bassford, Jr. | 106—237 |
| 2,140,657 | 12/1938 | Strauss | 106—237 |
| 2,948,626 | 8/1960 | Sanders, Jr. | 106—30 X |
| 3,043,747 | 7/1962 | Long | 106—30 UX |
| 3,258,347 | 6/1966 | Brown | 106—30 |
| 3,524,756 | 8/1970 | Signorino et al. | 424—34 X |

OTHER REFERENCES

Kirk-Othmer, Encyclopedia of Chemical Technology, 2nd ed, vol. 18, (pp. 21–31 relied on).

JOAN B. EVANS, Primary Examiner

U.S. Cl. X.R.

106—237, 238, 241; 424—34

UNITED STATES PATENT OFFICE
CERTIFICATE OF CORRECTION

Patent No. 3,694,237       Dated September 26, 1972

Inventor(s) Chester J. Piotrowski

It is certified that error appears in the above-identified patent and that said Letters Patent are hereby corrected as shown below:

In the heading, insert the name of the assignee:

Colorcon Incorporated, West Point, Pennsylvania, a corporation of Pennsylvania.

Signed and sealed this 8th day of May 1973.

(SEAL)
Attest:

EDWARD M. FLETCHER, JR.          ROBERT GOTTSCHALK
Attesting Officer                Commissioner of Patents